United States Patent [19]
Flatt et al.

[11] Patent Number: 6,068,695
[45] Date of Patent: May 30, 2000

[54] PROCESS FOR THE CONTINUOUS PREPARATION OF QUINACRIDONES

[75] Inventors: Thomas R. Flatt, Summerville; Mark A. Putnam, Hanahan; Ulrich Feldhues, Mt. Pleasant, all of S.C.

[73] Assignee: Bayer Corporation, Pittsburgh, Pa.

[21] Appl. No.: 09/352,896

[22] Filed: Jul. 13, 1999

[51] Int. Cl.$^7$ .......................... C09B 48/00; C07D 515/00
[52] U.S. Cl. .................. 106/497; 546/49; 546/56
[58] Field of Search ................... 546/49, 56; 106/497

[56] References Cited

U.S. PATENT DOCUMENTS

| | | | |
|---|---|---|---|
| 2,964,532 | 12/1960 | Klenke, Jr. et al. | 260/314.5 |
| 3,157,659 | 11/1964 | Deuschel et al. | 260/279 |
| 3,188,318 | 6/1965 | Mack et al. | 260/314.5 |
| 3,200,122 | 8/1965 | Streiff | 260/279 |
| 3,256,285 | 6/1966 | Fuchs et al. | 260/279 |
| 3,257,405 | 6/1966 | Gerson et al. | 260/279 |
| 3,317,539 | 5/1967 | Jaffe | 260/279 |
| 5,247,088 | 9/1993 | Flatt | 546/37 |
| 5,713,999 | 2/1998 | Badejo et al. | 106/495 |

FOREIGN PATENT DOCUMENTS

| | | |
|---|---|---|
| 0 863 186 | 9/1998 | European Pat. Off. . |

OTHER PUBLICATIONS

S.S. Labana and L.L. Labana, "Quinacridones", Chemical Reviews, vol. 67, 1–18, Jan. 25, 1967.

*Primary Examiner*—Zinna Northington Davis
*Assistant Examiner*—Bint A. Robinson
*Attorney, Agent, or Firm*—Joseph C. Gil; Richard E. L. Henderson

[57] ABSTRACT

This invention relates to a continuous process for the preparation of quinacridone pigments by
(a) preparing a reaction mixture by mixing
 (i) a 2,5-dianilinoterephthalic acid or ester thereof, and
 (ii) at least about 0.5 parts by weight, per part of component (a)(i), of a dehydrating agent;
(b) passing the reaction mixture through a continuous reactor having one or more heated zones at a temperature of about 80° C. to about 300° C. to form a crude quinacridone composition; and
(c) mixing a continuous stream of the crude quinacridone composition with a liquid in which the quinacridone pigment is substantially insoluble at a ratio of about 0.5 to about 15 parts by weight of the liquid per part by weight of the crude quinacridone composition.

6 Claims, No Drawings

PROCESS FOR THE CONTINUOUS PREPARATION OF QUINACRIDONES

BACKGROUND OF THE INVENTION

This invention relates to an economical continuous process for the preparation of quinacridone pigments having uniform particles of a narrow particle size distribution.

Processes for the preparation of quinacridone are known. E.g., S. S. Labana and L. L. Labana, "Quinacridones" in *Chemical Review*, 67, 1–18 (1967), and U.S. Pat. Nos. 3,157,659, 3,256,285, and 3,317,539. The quinacridones thus obtained, known as crude quinacridones, are generally unsuitable for use as pigments and must undergo one or more additional finishing steps to modify the particle size, particle shape, or crystal structure to achieve pigmentary quality.

A preferred method for preparing quinacridones involves thermally inducing ring closure of 2,5-dianilinoterephthalic acid intermediates, as well as known aniline-substituted derivative hereof, in the presence of polyphosphoric acid (e.g., U.S. Pat. No. 3,257,405) or even sulfuric acid (e.g., U.S. Pat. No. 3,200,122 and European Patent Application 863,186). After ring closure is complete, the melt is drowned by pouring into a liquid in which the quinacridone is substantially insoluble, usually water and/or an alcohol. The resultant crystalline pigment is then further conditioned by solvent treatment or milling in combination with solvent treatment.

Final particle size of quinacridone pigments can be controlled by the methods used in both synthesis and aftertreatment. For example, quinacridone pigments can be made more transparent by reducing the particle size or more opaque by increasing the particle size. In known methods, particle size is generally controlled during precipitation of the pigment by drowning or during milling or solvent treatment of the crude pigment. Tinctorial strength and transparency of pigments can also be affected by solvent treatment. Aftertreatment steps that manipulate the crude pigments particle size are often referred to as conditioning methods.

Although batchwise methods can produce good quality product, a more efficient continuous process would be desirable. Continuous process methods have been reported for other types of pigments, particularly copper phthalocyanines and perylenes (see U.S. Pat. Nos. 2,964,532, 3,188,318, and 5,247,088), but until now have not been reported for the preparation of quinacridones. The present invention provides such a continuous process for preparing and drowning quinacridones using smaller amounts of dehydrating agent than used in standard methods, even when such smaller quantities of the dehydrating agents produce high viscosities. In addition to allowing the use of smaller quantities of dehydrating agent, which would lower manufacturing costs and reduce environmental impact, the present invention produces quinacridones having a desirably narrow particle size distribution. The pigment particles are also generally smaller than those produced in batch processes and can be conditioned to produce deeper, more transparent pigments.

SUMMARY OF THE INVENTION

This invention relates to a continuous process for the preparation of quinacridone pigments comprising
(a) preparing a reaction mixture by mixing
    (i) a 2,5-dianilinoterephthalic acid or ester thereof, and
    (ii) at least about 0.5 parts by weight (preferably about 0.5 to about 10 parts by weight, more preferably 1 to 4 parts by weight), per part of component (a)(i), of a dehydrating agent (preferably polyphosphoric acid);
(b) passing the reaction mixture through a continuous reactor having one or more heated zones at a temperature of about 80° C. to about 300° C. (preferably about 100° C. to about 220° C., more preferably about 140° C. to about 200° C.) to form a crude quinacridone composition;
(c) mixing a continuous stream of the crude quinacridone composition with a liquid in which the quinacridone pigment is substantially insoluble (preferably a continuous stream of the liquid) at a ratio of about 0.5 to about 15 parts by weight (preferably 1 to 10 parts by weight) of the liquid per part by weight of the crude quinacridone composition;
(d) optionally, conditioning the resultant quinacridone pigment; and
(e) optionally, blending (preferably dry blending) the resultant quinacridone pigment with one or more quinacridone derivatives.

DETAILED DESCRIPTION OF THE INVENTION

Quinacridone pigments (by which is meant unsubstituted quinacridone, quinacridone derivatives, and solid solutions thereof) are prepared according to the invention by first ring-closing 2,5-dianilinoterephthalic acid intermediates, including known derivatives that are substituted in the aniline ring, by heating such terephthalic acid intermediates in a continuous process in the presence of a dehydrating agent (preferably polyphosphoric acid). The quinacridone is then drowned, preferably in a continuous process. The quinacridone pigment is preferably also subjected to additional conditioning steps to improve pigmentary properties and, if desired, blended with an additional quinacridone derivative.

The process of the invention is used to prepare either unsubstituted quinacridone or ring-substituted quinacridone derivatives, depending on whether the ring closure is carried out using unsubstituted 2,5-dianilinoterephthalic acid (or an ester thereof) or a substituted 2,5-dianilinoterephthalic acid derivative (or an ester thereof) having one or more substituents in at least one of the two aniline rings. Although essentially any substituted 2,5-dianilinoterephthalic acid derivatives known in the art can be used, particularly preferred substituted 2,5-dianilinoterephthalic acid derivatives are those in which both aniline moieties are substituted (typically with the same substituent) in the para position with groups such as halogen (preferably chlorine), $C_1$–$C_6$ alkyl (preferably methyl), and $C_1$–$C_6$ alkoxy (preferably methoxy). It is also possible to use 2,5-dianilinoterephthalic acid derivatives in which both aniline moieties are substituted in the ortho or meta positions. Examples of suitable substituted 2,5-dianilinoterephthalic acid derivatives include 2,5-di(4-chloroanilino)terephthalic acid, 2,5-di(4-methylanilino)terephthalic acid, 2,5-di(4-methoxyanilino)terephthalic acid.

It is also possible to use mixtures containing 2,5-dianilinoterephthalic acid and one or more derivatives thereof or mixtures containing two or more 2,5-dianilinoterephthalic acid derivatives. The use of such mixtures provides a particularly advantageous method for obtaining quinacridone solid solutions. Mixtures containing 2,5-dianilinoterephthalic acid and/or a derivative thereof in combination with a fully formed quinacridone pigment (generally in crude form) can also often be used.

Ring-closure step (a) is carried out in a dehydrating agent, particularly a strong acid such as polyphosphoric acid, acidic esters of polyphosphoric acid, or sulfuric acid. E.g., U.S. Pat. No. 4,758,665 and S. S. Labana and L. L. Labana, "Quinacridones" in *Chemical Reviews*, 67, 1–18 (1967). Polyphosphoric acid having a phosphate content equivalent to about 110 to 120% $H_3PO_4$ is particularly preferred. When using polyphosphoric acid, the weight ratio of polyphosphoric acid to the terephthalic acid intermediate is typically about 0.5:1 to about 10:1 (preferably 1:1 to 4:1). It is also possible to use about 70 to 100% (preferably 85 to 98%, more preferably 90 to 93%) sulfuric acid as the dehydrating agent. When using sulfuric acid, the weight ratio of sulfuric acid to the terephthalic acid intermediate is typically about 0.5:1 to about 20:1 (preferably 1:1 to 6:1). Although the lower relative amounts of dehydrating agent can give high viscosity reaction masses, the lower relative amounts are still generally effective. Moreover, even when viscosities are relatively high, the lower relative amounts of dehydrating agent are generally preferred because of cost considerations.

Although not necessary, it is often desirable to use a solvent in ring-closure step (a). Suitable solvents are liquids in which the reactants can be dissolved or suspended and which do not react appreciably with the reactants during ring closure. Examples of suitable solvents include polar solvents, such as dimethylformamide or dimethylsulfoxide, and nonpolar solvents such as aliphatic or aromatic hydrocarbons and derivatives thereof.

The components used in step (a) are preferably mixed within an unheated section or even a heated section of the reactor, provided that when doing so the components are adequately mixed and heated, even when the mixture is viscous. The reactive components can also be mixed before introduction into the continuous reactor. As used herein, the term "continuous reactor" encompasses any number of reactors through which solids, semi-solids, and melts can be passed while being heated and, optionally, while being mixed. Suitable continuous reactors can provide good heat transfer and thorough mixing, preferably even with highly viscous materials. Extruders comprise a particularly preferred type of continuous reactor. Examples of suitable extruders include mixing screw extruders (especially single-screw and double-screw extruders) arranged in single or multiple stages where heating and mixing can take place. The desired throughput rate is, of course, a factor in selecting the capacity of the extruder.

Regardless of the means used for mixing, the reaction mixture is passed through one or more heated zones in which a temperature of about 80° C. to about 300° C. is maintained, giving rise to an initial crude quinacridone. In general, the reaction is exothermic and heating within the mixture becomes particularly pronounced once the temperature reaches about 80° C. to about 120° C. The maximum temperature reached in the heated zone is generally dependent not only on the temperature applied externally to the reactor but also on the time during which the reaction mixture is retained in the apparatus and the nature of the dehydrating agent. Other factors, such as the viscosity of the reaction mixture and thermal stability of the intermediate product formed, should also be considered when selecting the reaction parameters. For example, when using the preferred dehydrating agent polyphosphoric acid, a preferred temperature range is about 100° C. to about 220° C. (or, even more preferably, from about 140° C. to about 200° C.). When using sulfuric acid as the dehydrating agent, the preferred temperature range is about 140° C. to about 220° C. Although sulfonation can occur, sulfonated pigment by-products can generally be removed by washing with aqueous base. On the other hand, because small amounts of sulfonated by-products can sometimes actually improve rheological and color properties, it is not always necessary to take steps to remove them or avoid their formation. Temperatures of at least about 180° C. produce surprisingly less significant sulfonation for at least some quinacridones.

Multistage heating is often desirable. When using a heating apparatus with more than one heating zone, it is generally preferable to begin the heating process at the lower end of the temperature range, to continue the heating process at one or more intermediate temperatures, and to complete the heating process at the upper end of the temperature range. In a typical three-zone reactor, for example, the reaction mixture can be passed through zones maintained at temperatures of about 90° C., about 120° C., and about 180° C.

The time during which the reaction mixture is heated in step (b) (that is, the time within the reactor) is preferably selected to be sufficiently long to allow the reaction to proceed to completion but not so long that undesirable side reactions form significant amounts of by-product. In the preferred temperature ranges described above, it is generally possible to achieve essentially complete reaction within approximately fifteen minutes, and sometimes in less than five minutes. The reaction time is, of course, somewhat dependent on the reaction temperature.

The crude quinacridone composition formed in the continuous reactor is drowned by mixing a continuous stream of the crude quinacridone composition with a liquid in which the quinacridone pigment is substantially insoluble, including water, a water-miscible solvent such as methanol or other lower aliphatic alcohols, or mixtures thereof. Suitable drowning liquids include water and/or water-miscible organic liquids; including, for example, lower aliphatic alcohols, such as methanol; ketones and ketoalcohols, such as acetone, methyl ethyl ketone, and diacetone alcohol; amides, such as dimethylformamide and dimethylacetamide; ethers, such as tetrahydrofuran and dioxane; alkylene glycols and triols, such as ethylene glycol and glycerol; and other such organic liquids known in the art. Other organic liquids can be used but are generally less preferred.

Because the dehydrating agent (a)(ii) is typically strongly acidic, it can be desirable to include a base in the drowning liquid in sufficient quantities to maintain an alkaline medium. The specific base used for this purpose is not critical but is generally an alkali metal hydroxide (preferably sodium or potassium hydroxide).

Depending on the type of reactor used and the pressure requirements downstream from the reactor, it may be necessary to use a separate pump to transfer the crude quinacridone composition from the reactor to the drowning apparatus. It may also be necessary or desirable to improve handling by diluting the crude quinacridone composition with about 1 to about 20 parts of additional acid before being mixed with the drowning liquid. However, the specific design of the mixing apparatus is generally not critical as long as the desired ratio of liquid to crude quinacridone composition is maintained.

Drowning step (c) can be carried out batchwise by introducing the reaction mixture from the continuous reactor of step (b) into one or more fixed volumes of the drowning liquid. The drowning step, however, is preferably carried out in a continuous process. When carrying out the drowning by a continuous process, a stream of the drowning liquid is generally introduced as a side stream or a centrally injected stream into the crude quinacridone product stream (even when using excess drowning liquid) using nozzles or other mixing devices known in the art. Although it is possible to use a pipe with a simple tee, it is generally preferable to use a drowning nozzle that reduces at least one of the component streams into one or more thin streams. It is also possible to use other types of nozzles, such as a ring-type nozzles, in which the crude quinacridone composition is introduced at low pressure and the drowning liquid is introduced in thin streams at higher pressure. The two streams can be mixed at the entrance of a high-speed shear pump, such as a rotor-stator type pump. Drowning can also be carried out by mixing the crude quinacridone composition and drowning liquid in a continuous stirred reactor or in a series of continuous stirred reactors. Another example of a continuous drowning apparatus is a loop reactor. When flammable liquids, such as low boiling point alcohols, are used, the drown stream can also be mixed with water in a continuous manner to reduce the risk of fire or explosion during isolation.

All of the drowning systems described above can be used at atmospheric or elevated pressures, although the pressure that is actually used is somewhat dependent on the required temperatures and the boiling points of the liquids being used. When the equipment is sealed and under pressure, the temperature of the drowning medium can be greater than the boiling point at atmospheric pressure. The liquid streams can even be mixed at or below room temperature to help control the initial heating that occurs during hydrolysis of the acidic reaction mass. Furthermore, lower drown temperatures give pigments having smaller particle sizes. On the other hand, it can be desirable to use higher temperatures to speed up the hydrolysis or to help increase the particle size during drowning. Because process cycle times can also be important, for example, because of manufacturing cost, shorter residence times in the mixing apparatus are generally preferred.

It is possible to include various known additives to the drowning liquid. The optional additives can be any of the customary pigment preparation additives known in the art that serve, for example, to improve color properties, lessen or avoid flocculation, increase pigment dispersion stability, and reduce coating viscosity. Suitable additives include, for example, dispersants or surfactants, metal salts, and various pigment derivatives. Examples of suitable dispersants include anionic compounds, such as fatty acids (such as stearic or oleic acid), fatty acid salts (i.e., soaps such as alkali metal salts of fatty acids), fatty acid taurides or N-methytaurides, alkylbenzenesulfonates, alkylnaphthalenesulfonates, alkylphenol polyglycol ether sulfates, naphthenic acids or resin acids (such as abietic acid); cationic compounds, such as quaternary ammonium salts, fatty amines, fatty amine ethylates, and fatty amine polyglycol ethers; and nonionic compounds, such as fatty alcohol polyglycol ethers, fatty alcohol polyglycol esters, and alkylphenol polyglycol ethers. Examples of suitable metal salts include various salts of alkali metals (such as lithium, sodium, and potassium), alkaline earth metals (such as magnesium, calcium, and barium), aluminum, transition and other heavy metals (such as iron, nickel, cobalt, manganese, copper, and tin), including, for example, the halide (especially chloride), sulfate, nitrate, phosphate, polyphosphate, sulfonate (such as methanesulfonate or p-toluenesulfonate, or even known quinacridone sulfonate derivatives), and carboxylate salts, as well as the oxides and hydroxides. Examples of suitable pigment additives include organic pigments having one or more sulfonic acid groups, sulfonamide groups, carboxylic acid, carboxamide, and/or (hetero)aryl-containing (cyclo)aliphatic groups. If used at all, such additives are used in amounts ranging from about 0.05 to 100% by weight (preferably 1 to 30% by weight and more preferably 1 to 10% by weight), based on the amount of pigment.

Regardless of the nature of the drowning medium used, the drowned pigment is obtained as a slurry that can be isolated using methods known in the art, such as filtration, and then dried if desired. Other collection methods known in the art, such as centrifugation, microfiltration, or even simple decantation, are also suitable. Preferred collection methods include continuous filtration using, for example, belt filtration, rotary drum filtration, ultrafiltration, or the like.

Before or after being isolated, the pigment can be conditioned, either batchwise or continuously, in an optional step (d) using methods known in the art, such as solvent treatment or milling in combination with solvent treatment. Final particle size of the pigment can be controlled by varying the method of aftertreatment. For example, pigments can be made more transparent by reducing the particle size or more opaque by increasing the particle size. Suitable milling methods include dry-milling methods such as sand-milling, ball-milling, and the like, with or without additives, or wet-milling methods such as salt-kneading, bead-milling, and the like in water or organic solvents, with or without additives.

Tinctorial strength and transparency of the pigment can also be affected by solvent treatment carried out by heating a dispersion of the pigment, often in the presence of additives, in a suitable solvent. Suitable solvents include organic solvents, such as alcohols, esters, ketones, and aliphatic and aromatic hydrocarbons and derivatives thereof, and inorganic solvents, such as water. Suitable additives include compositions that lessen or avoid flocculation, increase pigment dispersion stability, and reduce coating viscosity, such as polymeric dispersants (or surfactants). E.g., U.S. Pat. Nos. 4,455,173; 4,758,665; 4,844,742; 4,895,948; and, 4,895,949.

During or after the conditioning step it is often desirable to use various other optional ingredients that provide improved properties. Examples of such optional ingredients include fatty acids having at least 12 carbon atoms, such as stearic acid or behenic acid, or corresponding amides, esters, or salts, such as magnesium stearate, zinc stearate, aluminum stearate, or magnesium behenate; quaternary ammonium compounds, such as tri[($C_1$–$C_4$ alkyl)benzyl] ammonium salts; plasticizers, such as epoxidized soya bean oil; waxes, such as polyethylene wax; resin acids, such as abietic acid, rosin soap, hydrogenated or dimerized rosin; $C_{12}$–$C_{18}$-paraffin-disulfonic acids; alkylphenols; alcohols, such as stearyl alcohol; amines, such as laurylamine or stearylamine; and aliphatic 1,2-diols, such as dodecane-1,2-diol. Such additives can be incorporated in amounts ranging from about 0.05 to 100% by weight (preferably 1 to 30% by weight, more preferably 10 to 20% by weight), based on the amount of pigment.

The resultant pigment can be blended (preferably by dry blending) in optional step (e) with one or more pigment derivatives known in the art, particularly sulfonic acid, sulfonamide, and phthalimidomethyl derivatives of quinacridones. Although generally less preferred, such derivatives can also be added during other steps of the claimed invention.

Compared to previously known processes, pigments prepared according to the invention characteristically have a narrow particle size distribution and excellent color properties that are particularly suited for automotive applications.

Because of their light stability and migration properties, the quinacridone pigments prepared according to the present invention are suitable for many different pigment applications. For example, pigments prepared according to the invention can be used as the colorant (or as one of two or more colorants) for very fast pigmented systems, such as mixtures with other materials, pigment formulations, paints, printing ink, colored paper, or colored macromolecular materials. The term "mixture with other materials" can be understood to include, for example, mixtures with inorganic white pigments, such as titanium dioxide (rutile) or cement, or other inorganic pigments. Examples of pigment formulations include flushed pastes with organic liquids or pastes and dispersions with water, dispersants, and if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides: polymers and copolymers of acrylates, methacrylates, acrylonitrile, acrylamide, butadiene, or styrene; polyurethanes; and polycarbonates. The materials pigmented with the quinacridone pigments of the present invention can have any desired shape or form.

Pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in coating systems).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Example 1

Comparison Batch Process

To two parts of polyphosphoric acid (117% phosphoric acid) heated at about 90 to 110° C. was slowly added one part of 2,5-dianilinoterephthalic acid. The mixture, which became too viscous to stir effectively during the addition, was then heated slowly to a temperature of about 135° C. and then maintained at that temperature for 25 minutes. The reaction mixture became extremely thick and was not pourable. Because the mass readily solidified upon cooling, removal of the crude pigment from the reaction vessel for drowning was very difficult.

Examples 2–4

Continuous Reaction and Batchwise Drowning

Examples 2 to 4 were carried out using a continuous reaction step but a batchwise drowning step.

Example 2

Into a ¾ inch (about 20 mm) single screw extruder having a ratio of length to diameter of about 30:1 and three zones heated at 90° C., 120° C., and 180° C. were introduced 11.7 g per minute of 2,5-dianilinoterephthalic acid and 27.2 g per minute of polyphosphoric acid (117.7% phosphoric acid). The resultant mass was introduced into water. The resultant solid was collected by filtration and reslurried in water containing sodium hydroxide (pH greater than 10). The slurry was heated at 90 to 95° C. for one hour, then collected by filtration, washed until free of alkali, and dried to give an 85% yield of quinacridone (91.3% purity).

Example 3

Example 2 was repeated using 21.1 g per minute of 2,5-dianilinoterephthalic acid and 27.9 g per minute of polyphosphoric acid. An 86.1% yield of quinacridone having a purity of 96.6% was obtained.

Example 4

Example 2 was repeated using 4.6 g per minute of 2,5-di(4-methylanilino)terephthalic acid and 18.9 g per minute of polyphosphoric acid. A 95.6% yield of 2,9-dimethylquinacridone was obtained.

Examples 5–10

Continuous Reaction and Continuous Drowning

Examples 5 to 10 were carried out using a continuous reaction step and a continuous drowning step.

Example 5

Into a 50 mm twin screw extruder heated at 195° C. were introduced 25 g per minute of 2,5-dianilinoterephthalic acid and 78 g per minute of polyphosphoric acid (117% phosphoric acid). The resultant crude quinacridone melt contained less than 5% 2,5-dianilinoterephthalic acid starting material, partially ring closed intermediate, and other impurities. The melt was pumped through a mixing tee into a pressurized pipe heated at 120° C. through which was passed 70 g per minute of methanol. After being heated for about five minutes at 120° C., the resultant slurry was passed through a second mixing tee, where the heated slurry was mixed with 220 g of water. The slurry was passed through heat exchangers to cool the liquid below its boiling point (atmospheric pressure) and allow to exit the apparatus for filtration. The filtered presscake was washed until free of alkali and dried to give quinacridone (greater than 95% yield).

Examples 6–9

Examples 6–9 according to the invention were carried out by the method of Example 5 except for using the parameters set forth in the following Table. In each example quinacridone was obtained in greater than 95% yield.

TABLE

Reaction parameters for Examples 6 to 9

| Exs. | Extruder Parameters | | | Drown Parameters | | |
|---|---|---|---|---|---|---|
| | PPA (g/min) | DATA (g/min) | Processor temp. (° C.) | Methanol (g/min) | Initial temp. (° C.) | Heating temp. (° C.) |
| 6 | 51 | 25.9 | 160 | 65 | 56 | 120 |
| 7 | 58 | 21.9 | 160 | 126 | 50 | 140 |
| 8 | 58 | 21.9 | 160 | 126 | 85 | 140 |
| 9 | 58 | 21.9 | 160 | 90 | 80 | 140 |

PPA denotes polyphosphoric acid
DATA denotes 2,5-dianilinoterephthalic acid

Example 10

Example 5 was repeated using 25 g per minute of 2,5-di(4-methylanilino)terephthalic acid and 51 g per minute of polyphosphoric acid at a processor temperature of 160° C., followed by drowning with 100 g per minute of methanol (initial temperature of 25° C.) heated to 85° C. 2,9-Dimethylquinacridone was obtained in greater than 95% yield.

What is claimed is:

1. A continuous process for the preparation of quinacridone pigments comprising
    (a) preparing a reaction mixture by mixing
        (i) a 2,5-dianilinoterephthalic acid or ester thereof, and
        (ii) at least about 0.5 parts by weight, per part of component (a)(i), of a dehydrating agent;
    (b) passing the reaction mixture through a continuous reactor having one or more heated zones at a temperature of about 80° C. to about 300° C. to form a crude quinacridone composition;
    (c) mixing a continuous stream of the crude quinacridone composition with a liquid in which the quinacridone pigment is substantially insoluble at a ratio of about 0.5 to about 15 parts by weight of the liquid per part by weight of the crude quinacridone composition;
    (d) optionally, conditioning the resultant quinacridone pigment; and
    (e) optionally, blending the resultant quinacridone pigment with one or more quinacridone derivatives.

2. A process according to claim 1 wherein the 2,5-dianilinoterephthalic acid or ester thereof is 2,5-dianilinoterephthalic acid or an ester thereof, 2,5-di(4-chloroanilino)terephthalic acid or an ester thereof, 2,5-di(4-methylanilino)terephthalic acid or an ester thereof, or 2,5-di(4-methoxyanilino)terephthalic acid or an ester thereof.

3. A process according to claim 1 wherein in step (c) the continuous stream of the crude quinacridone composition from step (b) is mixed with a continuous stream of the liquid in which the quinacridone pigment is substantially insoluble.

4. A process according to claim 1 wherein the dehydrating agent is polyphosphoric acid or 70 to 100% sulfuric acid.

5. A process according to claim 1 wherein in step (c) the liquid is water and/or methanol.

6. A process according to claim 1 wherein in step (c) the liquid is water and/or methanol containing an alkali metal hydroxide in sufficient quantities to maintain an alkaline medium.

* * * * *